T. WALLIS.
CHAIN-PUMP.

No. 189,670. Patented April 17, 1877.

WITNESSES:
E. Wolff.
J. H. Scarborough

INVENTOR:
T. Wallis.
BY
ATTORNEYS.

UNITED STATES PATENT OFFICE.

THEODORE WALLIS, OF SCIPIO, NEW YORK, ASSIGNOR TO HIMSELF, SAMUEL EDDY, AND CHRISTOPHER FIERO.

IMPROVEMENT IN CHAIN-PUMPS.

Specification forming part of Letters Patent No. 189,670, dated April 17, 1877; application filed March 24, 1877.

*To all whom it may concern:*

Figure 1:
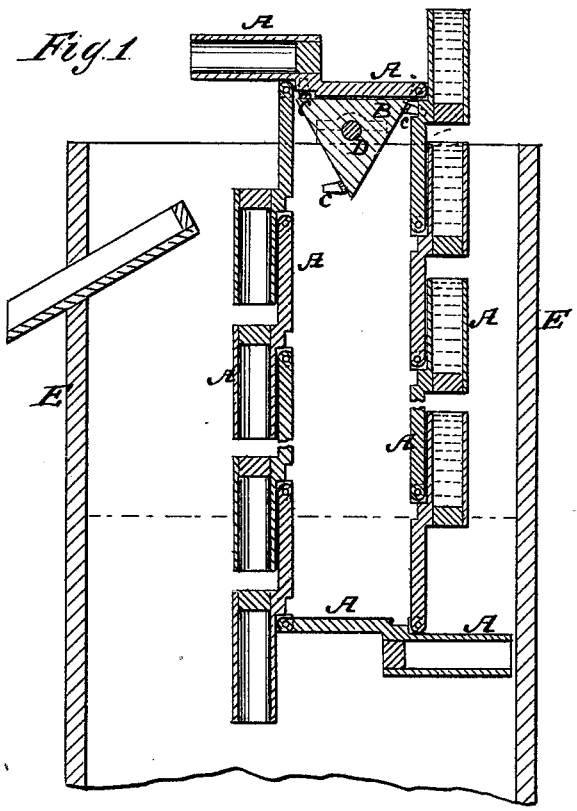
Figure 2:
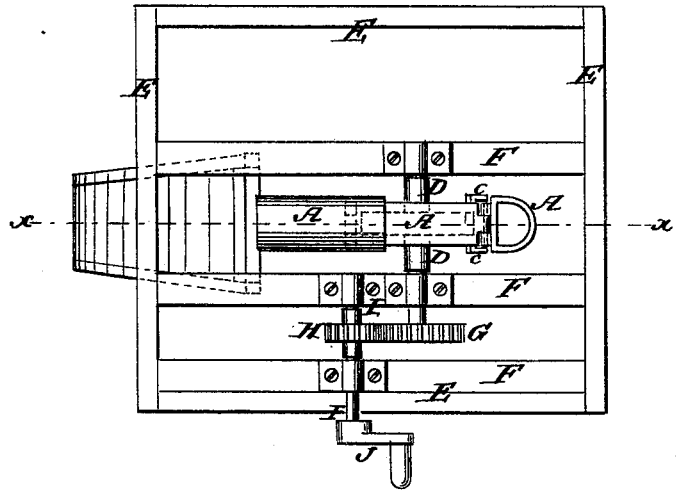

Be it known that I, THEODORE WALLIS, of Scipio, in the county of Cayuga and State of New York, have invented a new and useful Improvement in Chain-Pumps, of which the following is a specification:

Figure 1 is a vertical longitudinal section of my improved pump, taken through the line $x$ $x$, Fig. 2. Fig. 2 is a top view of the same.

Similar letters of reference indicate corresponding parts.

The object of this invention is to furnish an improved chain-pump which shall be simple in construction, inexpensive in manufacture, and reliable and effective in use.

The invention consists in the links made with their forward parts hollow, with an offset at their middle parts, and with lugs at their shoulders to receive the rear end of the preceding links, and with lugs at their rear ends to receive the shoulders of the succeeding links; and in the triangular wheel provided with the guides, in combination with the chain of bucket-links, as hereinafter fully described.

A A are the links, which are made with an offset where are formed the lugs by which they are pivoted to the rear ends of the next preceding link, as shown in Fig. 1. The forward parts of the links A are made cylindrical and hollow, to serve as buckets for raising the water. The endless chain A passes around a triangular wheel, B, the sides of which are made of the same length as the rear part of the links A. To the wheel B, at the rear side of each angle, is attached a fork, C, to guide the links into place, and to prevent them from slipping off said wheel. The forks C enter rabbets in the links A at their shoulders.

The wheel B is attached to a shaft, D, which revolves in bearings attached to the curb E, or to cross-bars F, attached to said curb. To the shaft D is attached a large gear-wheel, G, the teeth of which mesh into the teeth of a smaller gear-wheel, H, attached to a shaft, I, which revolves in bearings attached to the cross-bars F, and to the outer end of which is attached the crank J, by which the pump is operated.

With this construction, as the hollow parts of the links A pass over the wheel B, the water is discharged from them, and is received in the spout K, by which it is conducted into a pail, trough, or other receiver.

Having thus described my invention, I claim as new and desire to secure by Letters Patent—

1. The links A, made with their forward parts hollow, with an offset at their middle parts, and with lugs at their shoulders to receive the rear end of the preceding links, and with lugs at their rear ends to receive the shoulder of the succeeding link, substantially as herein shown and described.

2. The triangular wheel B, provided with the guides C, in combination with the chain of bucket-links A, substantially as herein shown and described.

THEODORE WALLIS.

Witnesses:
HORACE T. COOK,
CHARLES H. EDDY.